No. 736,641. PATENTED AUG. 18, 1903.
T. P. SEASTRUNK & J. P. ARCHER.
TROLLEY.
APPLICATION FILED JAN. 14, 1903.
NO MODEL. 2 SHEETS—SHEET 1.

Witnesses
Inventors
Thomas P. Seastrunk
James P. Archer

No. 736,641. PATENTED AUG. 18, 1903.
T. P. SEASTRUNK & J. P. ARCHER.
TROLLEY.
APPLICATION FILED JAN. 14, 1903.
NO MODEL. 2 SHEETS—SHEET 2.
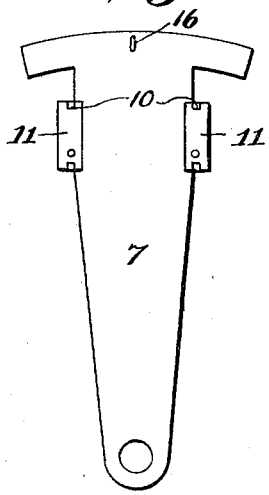
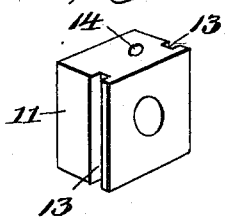
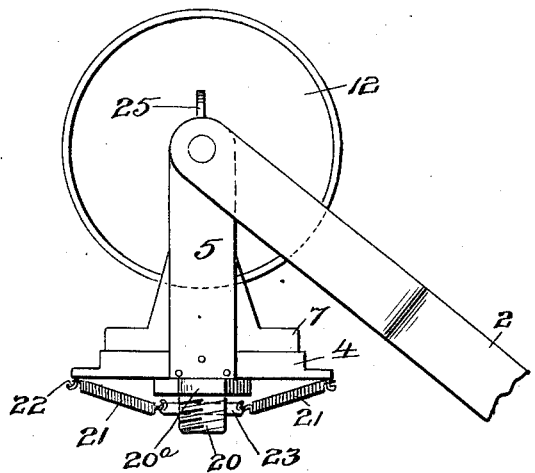
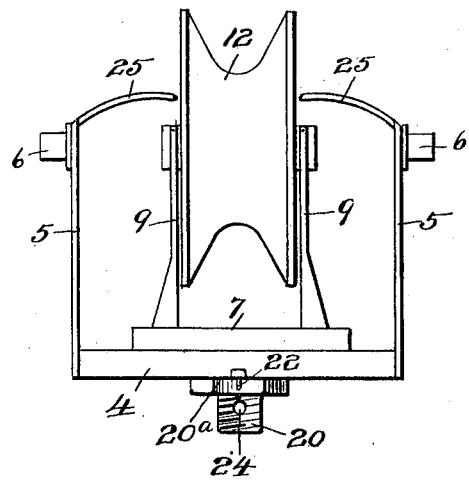
Witnesses
Inventors
Thomas P. Seastrunk
James P. Archer
Attorney No. 736,641. Patented August 18, 1903.

UNITED STATES PATENT OFFICE.

THOMAS P. SEASTRUNK AND JAMES P. ARCHER, OF DALLAS, TEXAS.

TROLLEY.

SPECIFICATION forming part of Letters Patent No. 736,641, dated August 18, 1903.

Application filed January 14, 1903. Serial No. 139,055. (No model.)

*To all whom it may concern:*

Be it known that we, THOMAS P. SEASTRUNK and JAMES P. ARCHER, citizens of the United States, residing at Dallas, in the county of Dallas and State of Texas, have invented certain new and useful Improvements in Trolleys, of which the following is a specification.

Our invention relates to trolleys for use on electric cars in which the power is obtained through a pole secured to the car and contacting with the electrical conductor or trolley-wire by means of a wheel journaled in the end of the pole.

The objects of our invention are to provide means by which the trolley-wheel is permitted to swing slightly to follow the direction of the wire. This we accomplish by means of a plate secured to arms journaled in the end of the trolley-pole, on which plate we mount a bracket carrying the trolley-wheel, said bracket being loosely secured to said plate, so as to permit it to swing, and has spring connections; so as to cause a positive return of the wheel to its normal position when the pressure of the wire is removed. By this structure it will be seen that the plate carrying the trolley-bracket is always horizontal no matter what the inclination of the pole, which is a very desirable feature, because it insures that the trolley-wheel will always have a vertical pivot. These advantages will be more clearly understood by reference to the accompanying drawings, in which—

Figure 1:
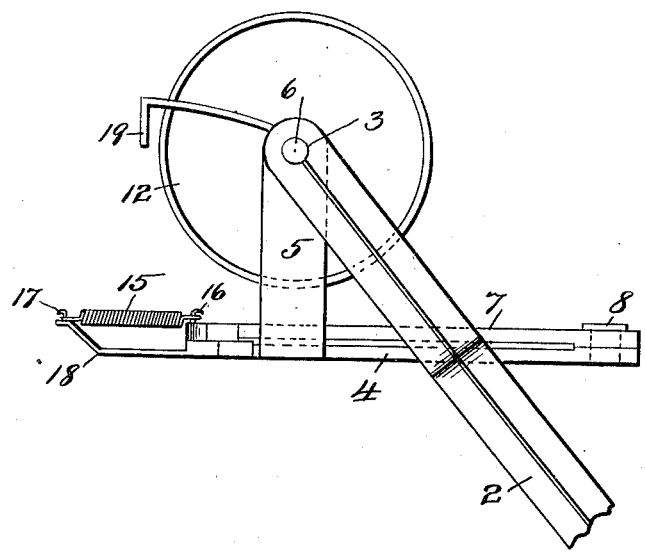
Figure 2:
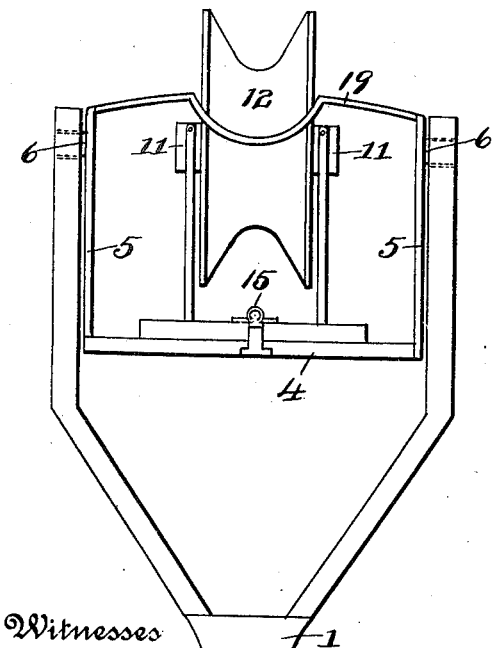
Figure 3:
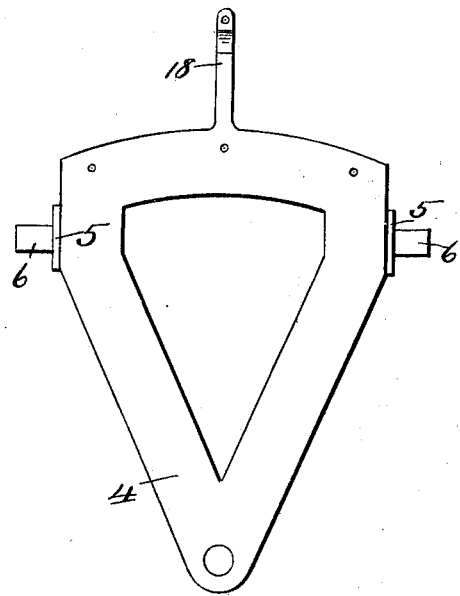

Figure 1 is a side view of a trolley-pole showing our invention, in which the pivotal point of the trolley-bracket is in advance of the wheel; Fig. 2, a rear view; Fig. 3, a plan view of the carrying-plate; Fig. 4, a plan view of the wheel-bracket; Fig. 5, a detail view of one of the wheel journal-boxes; Fig. 6, a side view of a modification of our invention in which the bracket is shown pivoted directly beneath the trolley-wheel, and Fig. 7 a rear view of modification shown in Fig. 6.

Referring to the drawings, in which similar reference characters indicate corresponding parts throughout the several views, 1 represents a trolley-pole, having forked end 2, with holes 3 near the ends.

4 represents the carrying-plate, which is suspended from the trolley-pole by means of vertical arms 5, having studs 6 extending outward therefrom to fit into holes 3 in the fork 2.

7 represents a plate slidably mounted on carrying-plate 4 and pivoted thereto at its front end by means of bolt 8.

9 represents vertical arms secured to plate 7, having their ends formed with a notch 10 to receive journal-boxes 11, in which are journaled the trolley-wheel 12.

The journal-boxes 11 are made, preferably, cubical in shape and have a groove 13 in each side to fit the sides of notch 10 and a hole 14 to receive the lubricating-oil, said hole being adapted to be filled with an absorbent material to hold the oil, if desired.

As the plate 7 is pivotally mounted on carrying-plate 4, it will readily appear that the wheel 12 may swing to the right or left, actuated by the pressure of the trolley-wire in turning curves, &c. To insure an instant return of the wheel to an alinement with the trolley-pole when side pressure is removed, we provide a spring 15, connecting a hook 16 on plate 7 with a hook 17 on an extension 18 to plate 4. 19 represents a wire-guard secured to the tops of arms 5 and is intended to prevent the trolley-wire becoming tangled in the device should the wheel leave said wire.

In Figs. 6 and 7 the plate 7 is shown pivoted to plate 4, directly beneath the trolley-wheel 12, by means of screw-stud 20, on which is secured a nut 20ª. 21 represents springs connecting hooks 22 on the bottom of plate 4 with the ends of a pin 23, passed through a hole 24 in said screw-stud 20, said springs being provided for the same purpose as spring 15, hereinbefore described—viz., to return the trolley-wheel to an alinement with the trolley-pole when pressure of the wire is removed. This feature is especially useful when the trolley-wheel is not in contact with the wire, as it is thus held in the position to be thrown against the wire. 25 represents guards secured on each arm 5, which may be used in either or both forms of bracket to the exclusion of the guard 19. (Shown in Figs. 1 and 2.)

Having thus described our invention, what we claim is—

1. In a trolley, a plate suspended from the trolley-pole, and a plate carrying the trolley-wheel pivotally mounted thereon, substantially as shown and described.

2. In a trolley, a pole having a forked end, a carrying-plate suspended from said forked end, a plate pivotally mounted on said carrying-plate and arms extending upwardly therefrom in which the trolley-wheel is journaled, substantially as shown and described.

3. In a trolley, a plate suspended from the trolley-pole, a plate carrying the trolley-wheel pivotally mounted thereon, and means to resiliently hold said trolley-wheel normally in alinement with the trolley-pole, substantially as shown and described.

4. In a trolley, a plate suspended from the trolley-pole, a plate carrying the trolley-wheel pivotally mounted thereon, and a spring connecting the two plates to normally hold the trolley-wheel in alinement with the trolley-pole, substantially as shown and described.

5. In a trolley, a plate suspended from the trolley-pole, a plate carrying the trolley-wheel pivotally mounted thereon, said plates being pivotally connected in advance of the trolley-wheel, and a coil-spring connecting the two plates, substantially as shown and described.

6. In a trolley, a trolley-pole having its upper end forked and perforated, a carrying-plate, arms secured thereto, studs on said arms to fit into the holes in said forked end, a plate pivotally mounted on said carrying-plate, arms secured to said plate, journal-boxes secured in said arms, a trolley-wheel journaled in said boxes, a wire-guard secured to the arms on said carrying-plate, and a spring connecting the two plates to normally hold the trolley-wheel in alinement with the pole, substantially as shown and described.

7. In a trolley, a plate suspended from the trolley-pole, and a plate carrying the trolley-wheel mounted thereon, substantially as shown and described.

In testimony whereof we hereto affix our signatures in the presence of two witnesses.

THOMAS P. SEASTRUNK.
JAMES P. ARCHER.

Witnesses:
J. C. JONES,
R. F. DUNLEVY.